(12) United States Patent
DeVita et al.

(10) Patent No.: US 9,731,832 B2
(45) Date of Patent: Aug. 15, 2017

(54) TORQUE CONVERTER FOR ROTORCRAFT

(71) Applicants: Michael Joseph DeVita, Riverside, CT (US); Mark Denton Bystry, Jr., Stratford, CT (US); Timothy Fred Lauder, Oxford, CT (US)

(72) Inventors: Michael Joseph DeVita, Riverside, CT (US); Mark Denton Bystry, Jr., Stratford, CT (US); Timothy Fred Lauder, Oxford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 530 days.

(21) Appl. No.: 13/922,356

(22) Filed: Jun. 20, 2013

(65) Prior Publication Data

US 2014/0373521 A1  Dec. 25, 2014

(51) Int. Cl.
| | | |
|---|---|---|
| B64D 35/00 | (2006.01) | |
| B64D 27/04 | (2006.01) | |
| B64D 35/02 | (2006.01) | |
| F16H 45/02 | (2006.01) | |

(52) U.S. Cl.
CPC ............ *B64D 35/00* (2013.01); *B64D 27/04* (2013.01); *B64D 35/02* (2013.01); *F16H 45/02* (2013.01)

(58) Field of Classification Search
CPC ........... F16H 41/30; F16H 61/60; F16H 61/64
USPC ................... 60/336, 337, 341, 351
See application file for complete search history.

(56) References Cited

U.S. PATENT DOCUMENTS

| | | | | |
|---|---|---|---|---|
| 2,644,535 A * | 7/1953 | Koup | ..................... | B64C 27/12 192/105 CE |
| 2,862,361 A * | 12/1958 | Koup | ..................... | B64D 35/00 244/17.11 |
| 4,062,187 A * | 12/1977 | Hilpert | ..................... | F16H 41/32 60/326 |
| 4,653,705 A | 3/1987 | Bensen | | |
| 4,970,860 A * | 11/1990 | Mezger | ..................... | B64C 27/12 60/337 |
| 5,222,418 A * | 6/1993 | Murota | ................ | F16H 57/0434 184/6.12 |
| 5,315,825 A * | 5/1994 | Giberson | ................ | F16D 33/06 60/336 |
| 6,145,842 A * | 11/2000 | Zellers | ..................... | F16H 41/30 277/394 |
| 7,017,341 B2 * | 3/2006 | Giberson | ................ | B02C 13/30 60/336 |
| 7,617,676 B2 * | 11/2009 | Fukushima | ............. | F16H 59/72 60/329 |
| 8,116,932 B2 | 2/2012 | Aldrich, III et al. | | |

(Continued)

*Primary Examiner* — Michael Leslie
*Assistant Examiner* — Matthew Wiblin
(74) *Attorney, Agent, or Firm* — Cantor Colburn LLP

(57) ABSTRACT

A torque converter for converting torque between an input shaft and an output shaft includes an impeller operably connected to the input shaft and rotatable therewith. The torque converter further includes a turbine operably connected to the output shaft and rotatable therewith. A fluid flow system directs a flow of motive fluid through the impeller and through the turbine to drive rotation of the output shaft relative to the input shaft. A lockup mechanism is engageable to urge rotation of the output shaft at an output shaft rotational speed identical to an input shaft rotational speed. A switching module controls an actuation system to urge engagement of the lockup mechanism.

4 Claims, 3 Drawing Sheets

(56) References Cited

U.S. PATENT DOCUMENTS

| | | | | |
|---|---|---|---|---|
| 2005/0151001 A1* | 7/2005 | Loper | ..................... | B64C 27/14 244/6 |
| 2006/0150621 A1* | 7/2006 | Nakata | .................. | F15B 21/042 60/337 |
| 2012/0055146 A1* | 3/2012 | Baraga | ................ | F16H 61/0031 60/327 |

* cited by examiner

TORQUE CONVERTER FOR ROTORCRAFT

BACKGROUND

The subject matter disclosed herein relates to the art of rotary wing aircraft and, more specifically to a torque converter for a rotary wing aircraft powered by a piston engine.

Some configurations of rotary wing aircraft, or rotorcraft, require the capability to allow for torque slip and freewheeling of the drive system, allowing the engine speed to be essentially independent of drive system speed to prevent stall or damage of the engine under certain operating conditions. These conditions include, but are not limited to, engine startup, increasing or decreasing drive system speed regardless of engine speed, stopping drive system output with the engine running, and autorotation maneuvers of the rotorcraft. Turbine engine powered rotorcraft typically do not require additional components to allow for torque slip as the turbine engine design inherently includes a torque slip capability. A freewheel unit is still necessary to allow for autorotation and engine shut down.

Piston engine powered rotorcraft require both additional torque slip and freewheel devices for operation. Typically, such rotorcraft utilize belt drives, which are effective at low power levels, but eventual wear requires regular inspection and replacement of the belts. Larger rotorcraft, operating at higher power levels, have used wet clutches with friction discs to allow for torque slip, but these configurations are prone to overheating and wear.

BRIEF DESCRIPTION

In one embodiment, a torque converter for converting torque between an input shaft and an output shaft includes an impeller operably connected to the input shaft and rotatable therewith. The torque converter further includes a turbine operably connected to the output shaft and rotatable therewith. A fluid flow system directs a flow of motive fluid through the impeller and through the turbine to drive rotation of the output shaft relative to the input shaft. A lockup mechanism is engageable to urge rotation of the output shaft at an output shaft rotational speed identical to an input shaft rotational speed. A switching module controls an actuation system to urge engagement of the lockup mechanism.

In another embodiment, a drive system includes an engine, a gearbox operably connected to the engine, and a torque converter operably connected to the engine via an input shaft and operably connected to the gearbox via an output shaft. The torque converter includes an impeller operably connected to the input shaft and rotatable therewith and a turbine operably connected to the output shaft and rotatable therewith. A fluid flow system directs a flow of motive fluid through the impeller and through the turbine to drive rotation of the output shaft relative to the input shaft. A lockup mechanism is engageable to urge rotation of the output shaft at an output shaft rotational speed identical to an input shaft rotational speed. A switching module controls an actuation system to urge engagement of the lockup mechanism.

In yet another embodiment, a helicopter includes an airframe and a drive system. The drive system includes a piston engine, a gearbox operably connected to the engine, and a torque converter operably connected to the engine via an input shaft and operably connected to the gearbox via an output shaft. The torque converter includes an impeller operably connected to the input shaft and rotatable therewith and a turbine operably connected to the output shaft and rotatable therewith. A fluid flow system directs a flow of motive fluid through the impeller and through the turbine to drive rotation of the output shaft relative to the input shaft. A lockup mechanism is engageable to urge rotation of the output shaft at an output shaft rotational speed identical to an input shaft rotational speed. A switching module controls an actuation system to urge engagement of the lockup mechanism. A rotor assembly is operably connected to the drive system.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
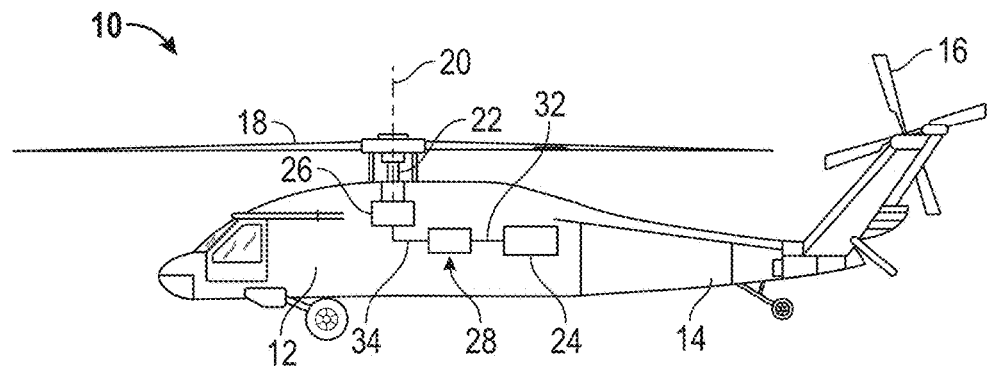
FIG. 1 is a schematic view of an embodiment of a helicopter.

Shown in FIG. 1 is schematic view of an embodiment of an aircraft, in this embodiment a helicopter 10. The helicopter 10 includes an airframe 12 with an extending tail 14 and a tail rotor 16 located thereat. While the embodiment of a helicopter 10 described herein includes an extending tail 14 and tail rotor 16, it is to be appreciated that the disclosure herein may be applied to other types of rotor craft as well as helicopters 10 of other configurations. A main rotor assembly 18 is located at the airframe 12 and rotates about a main rotor axis 20. The main rotor assembly 18 is driven by a drive shaft 22 connected to a power source, for example, an engine 24 (in this embodiment a piston engine) by a gearbox 26. Located between the engine 24 and the gearbox 26, and operably connected to both, is a locking hydraulic torque converter (LHTC) 28. The LHTC 28 allows for torque slip and freewheel between the engine 24 and gearbox 26 such that the gearbox 26 and main rotor assembly 18 rotational speeds can vary from the engine 24 rotational speed under selected operating conditions such as engine startup, shutdown, and autorotation. While shown in the context of a single rotor helicopter 10, it is understood that aspects can be used in coaxial rotor craft such as the X2® helicopter by Sikorsky Aircraft Corporation.

Figure 2:
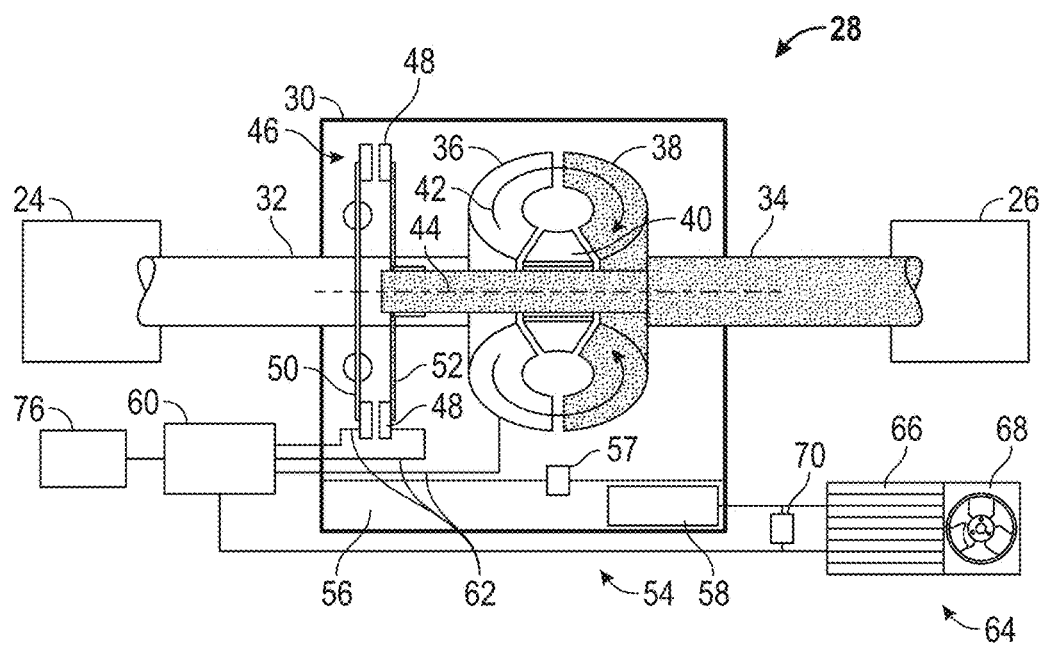
FIG. 2 is a schematic view of an embodiment of a drive system for a helicopter.

FIG. 2 illustrates a schematic layout of an embodiment of an LHTC 28. The LHTC 28 is generally located between the engine 24 and the gearbox 26 at an LHTC housing 30. The LHTC 28 is connected to the engine 24 via input shaft 32 and is connected to the gearbox 26 via an output shaft 34. The input shaft 32 is connected to an impeller 36, which is capable of driving a turbine 38 connected to the output shaft 34. A stator 40 section is located between the impeller 36 and the turbine 38 and directs a motive fluid, such as hydraulic fluid 42, between the impeller 36 and the turbine 38. In the embodiment of FIG. 2, stator 40 directs hydraulic fluid 42 discharged from turbine 38 back into the intake of impeller 36. The input shaft 32 and the output shaft 34 are arranged such that they are capable of substantially independent rotation about an LHTC axis 44. While in the embodiment of FIG. 2, the input shaft 32 and output shaft 34 share a common axis of rotation; it is understood that in other embodiments the input shaft 32 and output shaft 34 axes may be offset and/or nonparallel. A lockup mechanism 46, in some embodiments including friction discs 48, includes an input lockup 50 connected to the input shaft 32 and an output lockup 52 connected to the output shaft 34. When the lockup mechanism 46 is energized, and the input lockup 50 is engaged with the output lockup 52, the input shaft 32 and output shaft 34 are driven at a common speed.

The LHTC 28 is operated via a hydraulic control system 54 dedicated to the LHTC 28. The hydraulic control system 54 includes a fluid reservoir 56 located in the LHTC housing 30, along with a fluid pump 58 to maintain system pressure and to urge hydraulic fluid 42 to various components of the LHTC 28. The hydraulic control system may further include a filter/pressure relief valve schematically represented at 57 (FIG. 2). While in the embodiment of FIG. 2, the fluid reservoir 56, filter/valve 57, and fluid pump 58 are located within the LHTC housing 30, it is understood that in other embodiments the fluid reservoir 56, filter/valve 57, and fluid pump 58 may be located external of the LHTC housing 30 to accommodate another drive system arrangement. The flow of hydraulic fluid 42 is directed and controlled by a switching module 60 receiving operational commands from systems such as a flight control system 76. The switching module 60 is operably connected to the fluid pump 58 and having hydraulic lines 62 connected to the lockup mechanism 46 and the impeller 36 as required by the system operation. The hydraulic control system 54 further includes a fluid cooler 64 including, in some embodiments, a heat exchanger 66 and a blower 68. In operation, hydraulic fluid 42 is urged from the fluid reservoir 56 by the fluid pump 58, and flowed toward the fluid cooler 64. Depending on fluid temperature, the hydraulic fluid 42 may be flowed through the fluid cooler 64, or through a bypass valve 70, thus bypassing the fluid cooler 64. From the fluid cooler 64 (or the bypass valve 70), the hydraulic fluid 42 flows to the switching module 60 and to the impeller 36 and/or lockup mechanism 46. While not required in all aspects, the hydraulic control system 54 can be integral to the LHTC 28, such as within a common housing (not shown) as might occur in a field replaceable unit.

Figure 3:
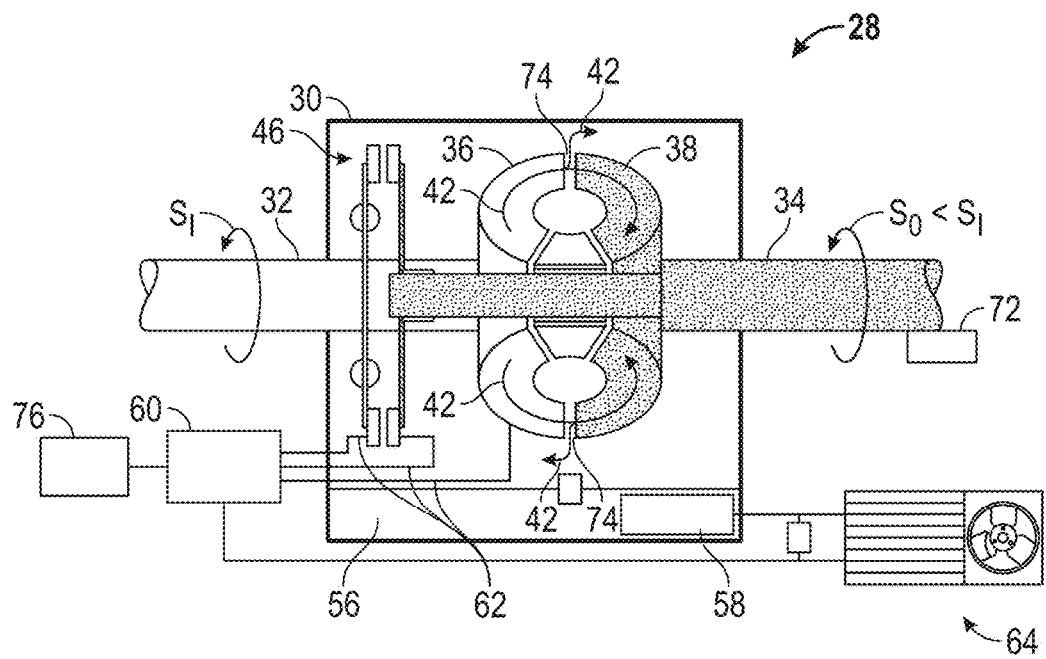
FIG. 3 is a schematic view of another embodiment of a drive system for a helicopter.

Illustrated in FIG. 3 is operation of the LHTC 28 during helicopter 10 operations such as engine 24 startup, ground idle of the helicopter 10, and/or slow down or stop of main rotor assembly 18 rotation while engine 24 is on. Torque applied at the input shaft 32 is greater than torque at the output shaft 34, and rotational speed $S_I$ of the input shaft 32 is greater than the rotational speed $S_O$ of the output shaft 34. The rotational speed $S_O$ may be greater than or equal to zero. During this operation mode, rotor brake 72 is engaged to slow or stop rotation of the output shaft 34. The impeller 36 pumps the hydraulic fluid 42 into the turbine 38 to transfer torque from input shaft 32 to output shaft 34. The rotational speed transferred from input shaft 32 to output shaft 34 slips because of the reaction torque applied by the rotor brake 72. This operation results in a large amount of heat in the hydraulic fluid 42, such that maximum cooling by the fluid cooler 64 is used. However, in other aspects, cooling can be achieved by other mechanisms consistent with the type of fluid 42 used. To reduce heat generation and torque output generated by the flow of hydraulic fluid 42 through the turbine 38, a turbine bypass 74 may be positioned along the flow of hydraulic fluid 42 created by the impeller 36 pumping hydraulic fluid 42 into the turbine 38 to reduce the hydraulic pressure applied to turbine 38. Reducing heat generation and torque output for this operation reduces the required cooling capacity of the fluid cooler 64 and reaction torque required by the rotor brake 72, respectively.

Figure 4:
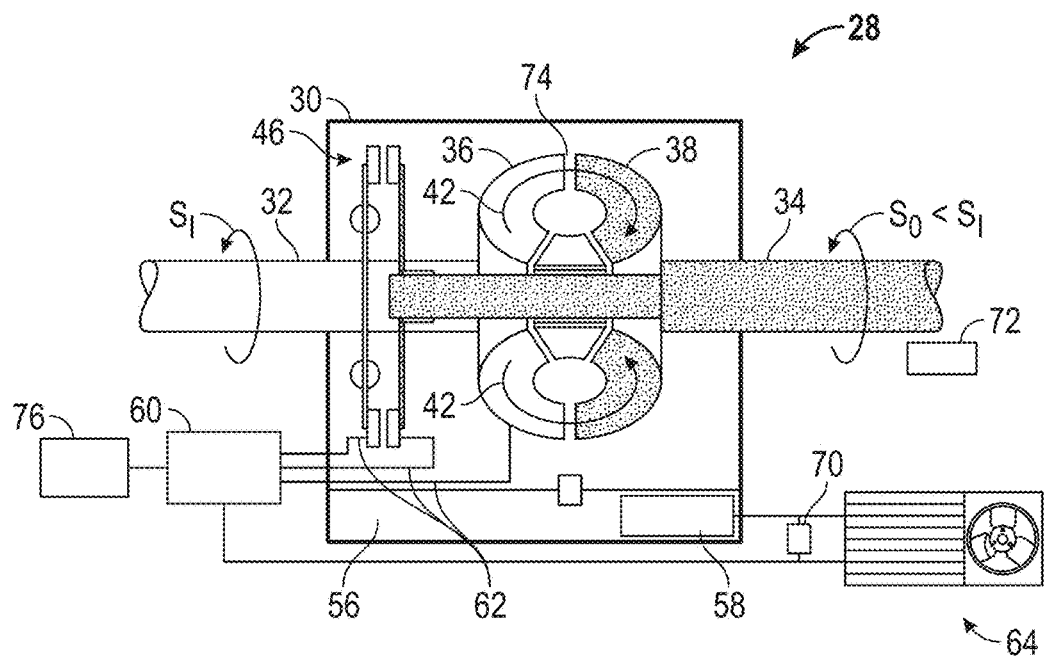
FIG. 4 is a schematic view of yet an embodiment of a drive system for a helicopter.

In FIG. 4, the rotor brake 72 is disengaged, but torque slip still occurs between the output shaft 34 and the input shaft 32. This equates with operation to bring the main rotor assembly 18 up to full speed while preventing stall of the engine 24. Hydraulic fluid 42 is pumped from the impeller 36 into the turbine 38 creating hydraulic pressure that drives rotation of the turbine 38 and the output shaft 34 since the rotor brake 72 is disengaged. The lockup mechanism 46, however, is not engaged, thus allowing torque slip between the output shaft 34 and the input shaft 32, such that speed and torque at the input shaft 32 is greater than speed and torque at the output shaft 34.

Figure 5:
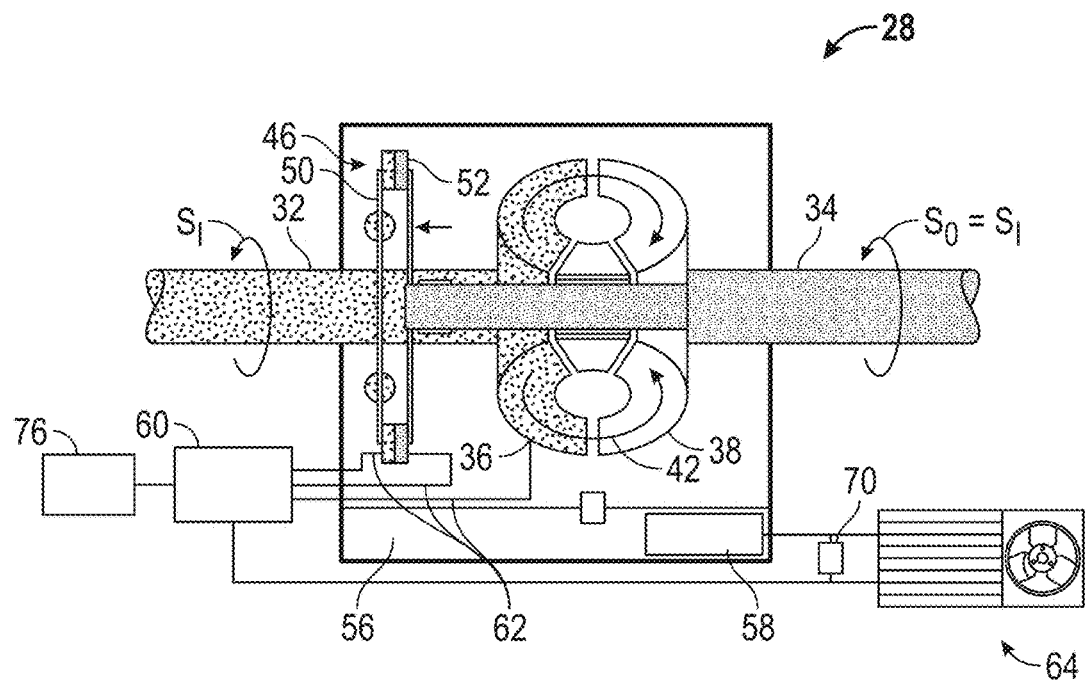
FIG. 5 is a schematic view of still another embodiment of a drive system for a helicopter.

FIG. 5 illustrates operation of the LHTC 28 during normal flight operation of the helicopter 10. When the output shaft 34 speed converges on the input shaft speed 32, hydraulic fluid 42 is urged to the lockup mechanism 46 to drive the input lockup 50 into engagement with the output lockup 52. While the lockup mechanism 46 to drive the input lockup 50 into engagement with the output lockup 52 is shown to be energized by the hydraulic fluid 42; it is understood that in other embodiments the lockup mechanism 46 may be energized by other means such as electric actuation or speed and/or torque activated passive mechanisms. With the lockup mechanism 46 engaged, the rotation of the output shaft 34 is driven by the input shaft 32 and the speed $S_O$ of the output shaft 34 equals the speed $S_I$ of the input shaft 32. Hydraulic fluid 42 is still pumped through the impeller 36, but the hydraulic fluid 42 does not drive the turbine 38. While shown as urging the input lockup 50 against the output lockup 52, it is understood that the output lockup 52 may be urged against the input lockup 50 or both the input lockup 50 and the output lockup 52 may be mutually urged together.

Figure 6:
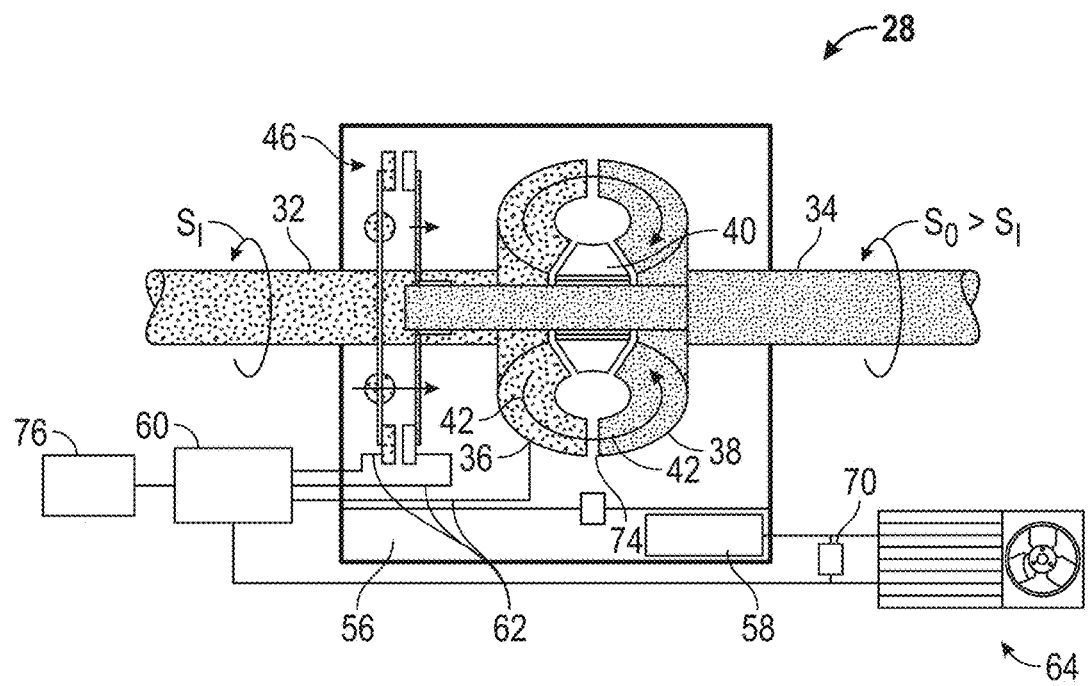
FIG. 6 is a schematic view of another embodiment of a drive system for a helicopter.

Shown in FIG. 6 is operation of the LHTC 28 during conditions, such as autorotation or engine 24 shutdown. In this mode, the locking mechanism 46 is disengaged, thus allowing the output shaft 34 to rotate at a higher speed than the input shaft 32 to reduce parasitic drag in the turbine 38 by hydraulic fluid 42 flowing therethrough, the turbine bypass 74 may be used to redirect the hydraulic fluid 42. In other embodiments, the output shaft 34 may include a mechanical free wheel clutch thus eliminating the necessity for the lockup mechanism 46 to be disengaged during conditions, such as autorotation and engine 24 shutdown.

The shown LHTC 28 is an independent component of the helicopter 10, rather than integrated into the gearbox 26, and utilizes an independent hydraulic control system 54, rather than gearbox 26 to drive the LHTC 28. Further the LHTC 28 provides its own cooling system in the form of fluid cooler 64. Isolating the LHTC 28 from the gearbox 26 in this manner adds safety in that it allows the LHTC 28 to continue operations even if other components, such has the gearbox 26, have failures of their lubrication system. Further, this independence allows greater flexibility in incorporating the LHTC 28 as an add-on component to an existing helicopter 10, by installing the LHTC 28 between the engine 24 and the gearbox 26. However, it is understood that the LHTC 28 or portions thereof can be integrated into the gearbox 26 in aspects of the invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For instance, aspects can be used with propeller assemblies and/or fans where blade pitch control and compactness of design may be useful. Further, while described in terms of use on a rotor craft, it is understood that aspects can be used with other drive trains in other contexts, such as in generators, ships, and cars. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotary wing aircraft comprising:
   an airframe;
   a drive system including: a piston engine;
   a gearbox operably connected to the engine; and
   a torque converter operably connected to the engine via an input shaft and operably connected to the gearbox via an output shaft, the torque converter including:
      an impeller operably connected to the input shaft and rotatable therewith;
      a turbine operably connected to the output shaft and rotatable therewith;
      a fluid flow system to direct a flow of motive fluid through the impeller and through the turbine to drive rotation of the output shaft relative to the input shaft, the fluid flow system including a fluid pump and a fluid reservoir for the motive fluid, the fluid reservoir dedicated to the torque converter and not the gearbox, the fluid flow system independent of the gearbox and the motive fluid isolated by the fluid flow system for use by the torque converter, the motive fluid urged from the fluid reservoir by the fluid pump;
         wherein the fluid flow system including the fluid reservoir and the motive fluid is isolated from the gearbox, and not integrated with the gearbox;
      a lockup mechanism engagable to urge rotation of the output shaft at an output shaft rotational speed identical to an input shaft rotational speed; and
      a switching module to control an actuation system to urge engagement of the lockup mechanism, the fluid pump operably connected to the switching module to flow the motive fluid to the switching module, and a hydraulic line connecting the switching module to the impeller;
         wherein the actuation system utilized is the fluid flow system operably connected via the switching module to provide fluid communication to the lockup mechanism by hydraulic lines to selectively control operation thereof, and the switching module receives operational commands from a flight control system; and
   a rotor assembly operably connected to the drive system.

2. The aircraft of claim 1, further comprising a motive fluid bypass to reduce hydraulic pressure from the motive fluid being pumped from the impeller into the turbine under select operating conditions via the switching module.

3. The rotary wing aircraft of claim 1, further comprising a torque converter housing, the gearbox and the switching module disposed exteriorly of the torque converter housing, and the fluid reservoir disposed within the torque converter housing.

4. The aircraft of claim 3, wherein the fluid pump is disposed within the torque converter housing; and the fluid flow system further includes a fluid cooler to reduce a temperature of the motive fluid, the fluid cooler disposed exteriorly of the torque converter housing.

* * * * *